(12) United States Patent
Breen et al.

(10) Patent No.: US 7,497,172 B2
(45) Date of Patent: Mar. 3, 2009

(54) METHOD TO DECREASE EMISSIONS OF NITROGEN OXIDES AND MERCURY THROUGH IN-SITU GASIFICATION OF CARBON/WATER SLURRIES

(75) Inventors: Bernard P. Breen, Pittsburgh, PA (US); Robert A. Schrecengost, Beaver, PA (US)

(73) Assignee: Breen Energy Solutions, Carnegie, PA (US)

( * ) Notice: Subject to any disclaimer, the term of this patent is extended or adjusted under 35 U.S.C. 154(b) by 292 days.

(21) Appl. No.: 11/249,977

(22) Filed: Oct. 12, 2005

(65) Prior Publication Data

US 2007/0079737 A1    Apr. 12, 2007

(51) Int. Cl.
*F23J 15/00* (2006.01)
(52) U.S. Cl. .......................... 110/345; 95/134; 95/901
(58) Field of Classification Search ............ 95/134, 95/901; 110/342–345, 348, 215
See application file for complete search history.

(56) References Cited

U.S. PATENT DOCUMENTS

| | | | |
|---|---|---|---|
| 4,237,747 A * | 12/1980 | Dudleston et al. ............. 74/516 |
| 5,347,938 A * | 9/1994 | Takazawa ................... 110/346 |
| 5,746,144 A * | 5/1998 | Breen et al. ................. 110/345 |
| 5,908,003 A | 6/1999 | Hura et al. |
| 5,915,310 A | 6/1999 | Hura et al. |
| 6,213,032 B1 | 4/2001 | Breen et al. |
| 6,357,367 B1 * | 3/2002 | Breen et al. ................. 110/345 |
| 6,451,094 B1 | 9/2002 | Chang et al. |
| 6,558,454 B1 | 5/2003 | Chang et al. |
| 6,726,888 B2 | 4/2004 | Lanier et al. |
| 2003/0185718 A1* | 10/2003 | Sellakumar ................. 422/171 |
| 2004/0134396 A1 | 7/2004 | Lanier et al. |

OTHER PUBLICATIONS f. El-Mahallawy, Fundamentals and Technology of Combustion, 2002, Elsevier, first Edition, pp. 601-602.*

* cited by examiner

*Primary Examiner*—Kenneth B Rinehart
(74) *Attorney, Agent, or Firm*—Buchanan Ingersoll & Rooney PC

(57) ABSTRACT

In a method for removing $NO_x$ from the flue gas using a coal water slurry, other carbon containing fuel and water, or unburned carbon existing in the furnace itself due to continuing combustion, the ratio of carbon to water is adjusted so that a portion of the carbon forms activated carbon after injection of the fuel slurry into the flue gas. The activated carbon is then available to collect mercury chloride from the flue gas which has been formed through the enhancement of the mercury and chlorine oxidation reaction, enhanced through the heterogeneous reaction mechanism of this same activated carbon in the primary combustion fuel.

20 Claims, 5 Drawing Sheets

Fly Ash LOI Increase from Active Carbon Generation
60% Carbon in Reburn Fuel, Baseline LOI = 2.0%

METHOD TO DECREASE EMISSIONS OF NITROGEN OXIDES AND MERCURY THROUGH IN-SITU GASIFICATION OF CARBON/WATER SLURRIES

FIELD OF INVENTION

The invention relates to a method for removing nitrogen oxides and mercury from emissions from combustion devices.

BACKGROUND OF THE INVENTION

Much work has been done to remove pollutants from emissions from coal fired furnaces. The focus of most of these efforts has been toward the removal of particulates, nitrogen oxides, or $NO_x$ and sulfur oxides, or $SO_x$, from flue gas. Commercially available techniques for reducing nitrogen oxide emissions in furnace flue gases include low-$NO_x$ burners, overfire air, selective non-catalytic $NO_x$ reduction (SNCR), selective catalytic reduction (SCR), and reburning.

Reburning is a technique whereby a fraction of the total thermal input to the furnace is injected above the primary combustion zone to create a fuel rich zone. Hydrocarbon fuels such as coal, oil, or gas are effective $NO_x$ reducers, but non-carbon containing fuels such as hydrogen and ammonia or non-hydrogen containing fuels such as carbon monoxide may also form $NH_i$ or HCN intermediates which reduce $NO_x$. Stoichiometry of about 0.90 (10% excess fuel) in the reburn zone is considered optimum for $NO_x$ control. Thus, it is apparent that the amount of reburn fuel required for effective $NO_x$ control is directly related to the stoichiometry of the primary combustion zone and, in particular, the amount of excess air therein. Under typical furnace conditions of 2% to 4% excess oxygen, a reburn fuel input of over 10% of the total fuel input to the furnace is usually necessary to form a fuel-rich reburn zone. The reburn fuel is injected at high temperatures in order to promote reactions under the overall fuel-rich stoichiometry.

Typical flue gas temperatures at the injection point are 1700K (2600° F.) or greater. Completion air is introduced into the flue gases downstream of the fuel-rich reburn zone in order to complete combustion of any unburned hydrocarbons and carbon monoxide (CO) remaining in the flue gases leaving the fuel-rich reburn zone. In addition, it is also known that rapid and complete dispersion of the reburn fuel in the flue gases is beneficial. Thus, the injection of reburn fuel is frequently accompanied by the injection of a carrier fluid, such as recirculated flue gases, for the purpose of promoting mixing. U.S. Pat. No. 5,746,144 discloses the injection of a coal and water slurry as the reburn fuel. U.S. Pat. No. 6,213,032 discloses injection of an oil and water mixture. U.S. Pat. No. 6,357,367 discloses a biomass and water slurry injection.

To the extent that the recirculated flue gas contains oxygen, the amount of reburn fuel must be increased, because whenever there is proportionally more oxygen than reburn fuel the reburn zone remains overall fuel-lean. However, such fuel-lean reburn provides similar $NO_x$ reduction as conventional reburn without the complexity of adding and mixing completion air to complete combustion of the reburn fuel. U.S. Pat. Nos. 5,908,003 and 5,915,310 disclose fuel-lean reburn with gaseous hydrocarbons. The slurry reburn patents U.S. Pat. Nos. 5,746,144, 6,213,032 and 6,357,367 disclose the injection and in-site gasification of various fuel/water slurries, with the subsequent dispersion and mixing of the gasification products used to promote locally fuel-rich reburn zones in an overall fuel-lean flue gas environment.

While the art has focused primarily on the removal of $NO_x$ and $SO_x$ from flue gas, there are also concerns about emissions of mercury and other elemental metals such as chromium, arsenic and lead from combustion devices. Mercury (Hg), the eightieth element, is an important pollutant. As a vapor in its elemental form, it is a poison of the nervous system. Most industrial uses of mercury today are carefully controlled. The biggest sources of environmental mercury are coal combustion and the combustion of municipal solid waste. Burning coal and especially municipal solid waste compositions may also result in emissions containing chromium, arsenic and lead.

At the levels common in the atmosphere the concentrations are usually safe. However, the mercury accumulates in lakes where it is further accumulated in fish. These fish, with organic mercury molecules in them, can be hazardous to individuals who eat them. Some states request that people eat fish from some lakes no more frequently than once a week. Often it is stated that pregnant women and small children should eat no such fish.

It is known that mercury will combine with chlorine to form mercury chloride and that activated carbon and other fine particulates, such as are present in ordinary fly ash, can capture mercury chloride. But, collection by the use of activated carbon is very expensive. One way to lessen the expense of using activated carbon is to inject raw carbonaceous material into flue gas where the temperature of the flue gas will cause formation of activated carbon. Chang et al. disclose in U.S. Pat. Nos. 6,451,094 and 6,558,454 that one can inject a raw carbonaceous starting material into the flue gas at any location upstream of the particulate collection device in a furnace to form activated carbon particles in the flue gas. The raw carbonaceous material can be injected in dry powdery form or as a wet slurry. These particles may then absorb mercury chloride formed in the flue gas.

Mercury is emitted in power plant flue gases because the elemental form has a relatively high vapor pressure at usual stack flue gas temperature conditions. As such, the elemental mercury is emitted as a vaporous gas, Hg(v), which is very difficult to separate or filter; whereas if the mercury is oxidized it is no longer an elemental vapor. Moreover, the oxidized form exhibits a much lower vapor pressure and tends to collect or adsorb into surfaces of flyash particles or activated carbon particles within the flue gas. Those particles are largely collected before the stack gas escapes.

Mercury does not oxidize to stable concentrations of mercury chloride at temperatures above 1061K (1,450° F.), and oxidation may or may not occur within the temperature range 1005K (1,350° F.) to 1061K (1,450° F.) depending upon gas concentrations and moisture. At temperatures below 755K (900° F.) the rate of oxidation effectively ceases.

Generally, the prior art literature that addresses reduction of $NO_x$ and $SO_x$ in flue gas says nothing about reduction of mercury or other metals. Conversely, the literature that is concerned with mercury removal, says little or nothing about reducing $NO_x$ and $SO_x$. Yet, many coals when burned produce $NO_x$ and/or $SO_x$ as well as mercury in the flue gas. Consequently, there is a need for a process that will reduce $NO_x$ and/or $SO_x$ as well as mercury emissions in flue gas.

Preferably, a single treatment step or injection of a single stream of materials should accomplish this reduction. While U.S. Pat. No. 6,726,888 and U.S. Patent Application 2004/0134396 disclose a method to create carbon through inefficient combustion and/or through inefficient completion of reburn combustion, thus at the same time lowering the emissions of $NO_x$, the carbon remaining is the result of the combustion process. This combustion process involves stoichiomtric diffusion flame mechanisms that inherently result in high temperatures and surface vitrification (or ash melting). Thus, even inefficient combustion results in deactivation of the carbon surface and is not an optimum method of producing highly active carbon surfaces. Additionally, these patents involve not a single step, but the interaction of multiple burner, overfire air and/or completion air adjustments.

SUMMARY OF THE INVENTION

In a method of removing mercury and $NO_x$ from flue gas produced by combustion devices burning mercury and chlorine containing fuel, the flue gas passes from a combustion zone in which the temperature exceeds 2600° F., through a first temperature zone in which the temperatures range from 1750° F. to 2100° F., through a second temperature zone in which the temperatures range from 900° F. to 1450° F., and through a particle removal device. A slurry of a carbon containing reburn fuel such as coal and water is prepared in a manner in which the ratio of water to reburn fuel is such that when the slurry is injected into the flue gas in the first temperature zone, a first portion of the reburn fuel and water will undergo an in-situ coal/water gasification reaction, gasify and then combine with a portion of the $NO_x$ in the flue gas, and a second portion of the reburn fuel will form carbon particles with the surface activated by the lower temperature carbon/water gasification reaction. This slurry is injected into the flue gas in the first temperature zone where the first portion of the reburn fuel gasifies and then combines with a portion of the $NO_x$ in the flue gas and a second portion of the reburn fuel forms activated carbon particles. When the burner mixing and combustion process is inefficient, the resultant flue gas contains unburned carbon. In this case, it is not necessary to provide the carbon to be activated through slurry injection, and water injection alone is all that is necessary to activate the carbon that is present in the flue gas due to continuing combustion. The flue gas and activated carbon particles pass through the second temperature zone where the mercury and chlorine present in the flue gas as a result of combustion of the mercury and chlorine containing fuel will combine to form HgCl and/or $HgCl_2$ and at least a portion of the HgCl and $HgCl_2$ will bind to the activated carbon particles. Finally, the flue gas containing these activated carbon particles is directed to the particle removal device for removal of the activated carbon particles.

One may add fly ash, treated ash, HCl, $NH_3Cl$, other calcium containing compounds, Br, Cl, CaCl, $CaCO_3$ and/or CaO to the slurry. The carbon containing fuel may be or contain municipal solid wastes or polyvinyl chloride.

DESCRIPTION OF THE PREFERRED EMBODIMENTS

Figure 1:
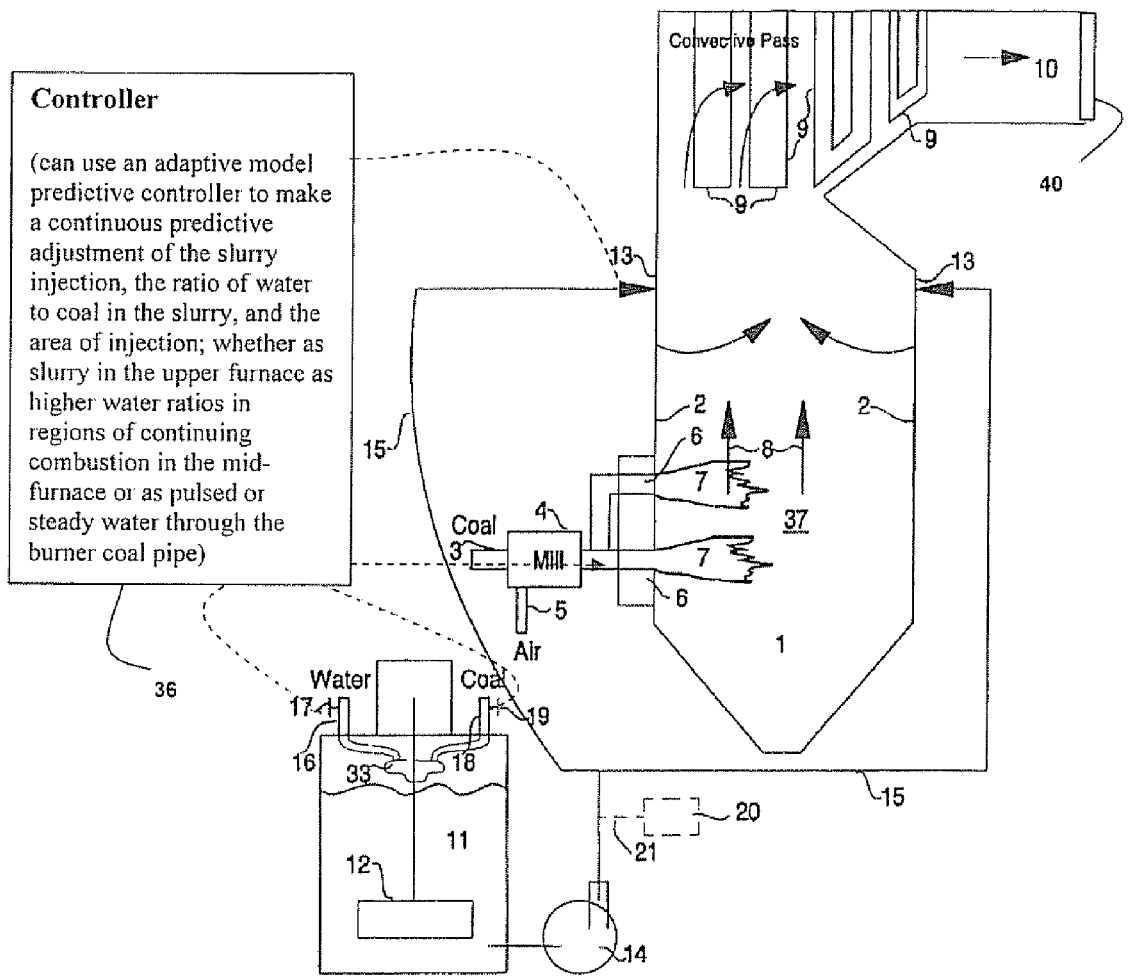
FIG. 1 is a diagram of a wall fired furnace modified to practice the process of the present invention.

In a coal fired furnace 1 of the type shown in FIG. 1, coal and air are fed into a mill 4 through pipes 3 and 5. In the mill the coal is pulverized and then carried by the air stream into the furnace through inlets 6. There the pulverized coal is ignited forming flame 7 in primary combustion zone 37 forming flue gas indicated by arrows 8. As the flue gas exits the radiant walled furnace, it passes through heat exchangers 9 in the convective pass and exits the furnace through duct 10. Within the combustion zone the temperature of the flue gas exceeds 2600° F. As the flue gas rises in the furnace it cools. In a first temperature zone near injectors 13, the flue gas is at a temperature of from 1750° F. to 2100° F. In the convective pass the temperature ranges from 950° F. to 1450° F. At least one particulate removal device 40 is provided in duct 10 to remove particles from the flue gas before the gas enters the atmosphere. Typically, the particle removal device will be a wet or dry electrostatic precipitator, wet or dry baghouse filter or wet or dry scrubber.

In the present method we inject a slurry of reburn fuel, such as coal, and water into the first temperature zone through injectors 13. The ratio of water to reburn fuel is such that when the slurry is injected into the first temperature zone a portion of the reburn fuel will gasify and then combine with a portion of the $NO_x$ in the flue gas. A second portion of the fuel will form activated carbon particles. The reburn fuel may provide up to 10.0% of the total heat input to the furnace.

We prefer to inject the water or slurry in such a manner so that the gasification occurs adjacent the furnace tube wall. That method of injection will limit furnace tube corrosion.

As shown in FIG. 1 we provide a mixing tank 11 where the coal water slurry is created. Coal injected through pipe 18 and water injected through pipe 16 are combined in chamber 33 before falling into the tank. Valves 17 and 19 are provided to control the flow of water and coal into the tank so that any desired coal-to-water ratio can be achieved in the slurry, even down to zero coal content. Mixing paddle 12 keeps the slurry thoroughly mixed. Pump 14 draws the slurry from the tank and pumps the slurry through pipes 15 to injectors 13 for injection into the first temperature zone. If desired, one or more additives can be injected into the slurry from supply 20 through pipe 21. The additives can be fly ash, HCl, $NH_3$, urea, $NH_3Cl$, $Cl_2$, calcium-containing compounds such as CaCl, CaO and $CaCO_3$ or ash treated with one or more of Br, Cl, HCl, CaCl, $CaCO_3$ and CaO.

The injectors 13 may be a single pipe. In one preferred embodiment shown in FIG. 2 two injector nozzles 24 and 26 are connected to pipe 15. Pump 30 is connected to injector 26 to insert air or other additives into the slurry. A diffuser 22 is provided on injector 24. An optional air injector 28 may be provided. Also, one may provide an injector 27 for adding another fuel, such as natural gas.

Figure 3:
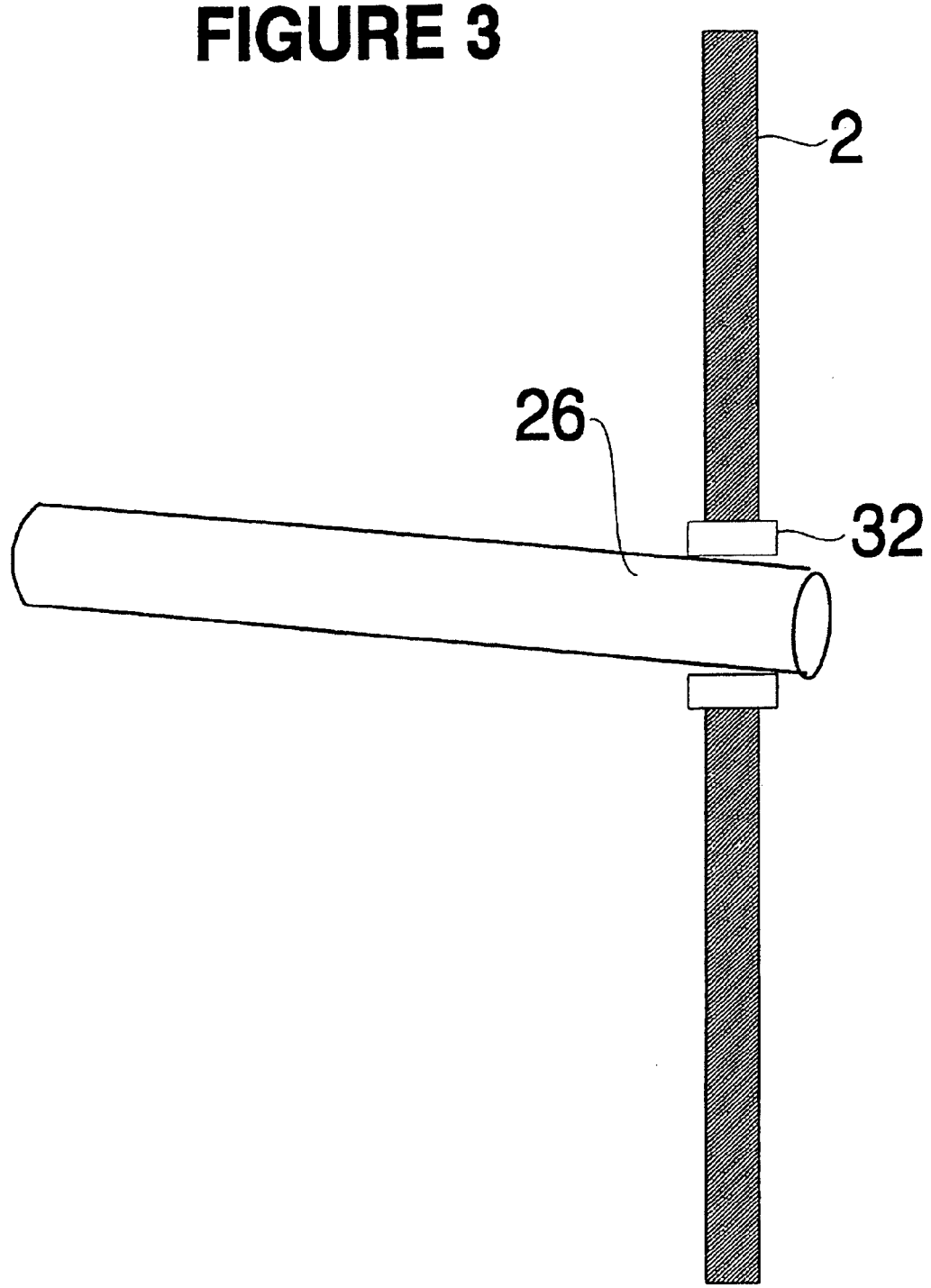
FIG. 3 is a diagram of a second preferred injector that can be used in the process.

In a second present preferred injector shown in FIG. 3, the nozzle 26 is mounted on a housing 32 in the furnace wall 2 so that the position of the nozzle can be changed directing the slurry downward, upward, horizontally left, horizontally right or straight into the flue gas. Consequently, the slurry can be directed to areas of higher or lower temperature within the first temperature zone, which may also be spinning tangentially.

Yet another option is to inject water into the coal stream as that stream enters the burner. The water will enable the coal/ water gasification in the furnace where the temperature ranges from 650° F. to 2600° F.

An adaptive model predictive controller 36 could be used to make a continuous predictive adjustment of the slurry injection, the ratio of water to coal in the slurry, and the area of injection; whether as slurry in the upper furnace, as higher water ratios in regions of continuing combustion in the mid-furnace (exiting the primary combustion zone) or as pulsed water through the burner coal pipe.

In the embodiment of FIG. 1 the reburn fuel is coal. However, other fuels, such as municipal waste, could be used. If such wastes contain polyvinyl chlorides and other chlorine containing wastes these compounds may be a chlorine source.

Although the temperature range and the oxygen concentration (11% to zero percent) in the upper furnace injection region are both too low to promote efficient combustion, the intense radiation and convective heat transfer in this region promotes the reaction of the injected water and carbon, or in cases of high unburned carbon regions existing in the furnace due to continuing combustion, the intense heat transfer promotes the reaction of the injected water and unburned carbon present in the furnace gases. This carbon-water shift reaction is a centuries old industrial process; an example is its use in converting coal into city gas throughout the late nineteenth century. Limiting the water content of the slurry below the stoichiometric amount of water needed for full carbon conversion, or limiting the amount of water injection below the stoichiometric amount of water needed for full gasification of the unburned carbon cloud in the furnace gases, leads to generation of a customized and controllable active carbon surface from a wide range of solid and liquid fuels and/or wastes containing carbon.

The products of the carbon-water reaction are $CO$, $H_2$ and the residual carbon surface for which there was limited water to complete the reaction. At the same time, the limited water reaction with the solid carbon provides the desired customized activated carbon surface. As each carbon particle gasifies, the carbon monoxide formed must diffuse out of the remaining char particle, creating increased surface area as the carbon reacts to form CO on a molecular level. This reaction creates void spaces or pores where the reacted carbon atoms have left the solid structure because of gasifying to carbon monoxide. The carbon particle left behind has a very high surface-to-volume ratio because of the gasification reaction stripping carbon atoms and tar-like heavy volatiles away from the structure of the particle. This water activated particle is much more desirable than a carbon surface formed from incomplete or inefficient combustion. Combustion causes high temperatures which melt, polymerize or vitrify the residual particle surface into what are commonly known as cenospheres. In contrast, the water-carbon gasification reaction takes place at temperatures as low as 1000° F., absorbing heat and resulting in an activated rather than a melted surface.

The CO and $H_2$ react to reduce $NO_x$ as they mix with the surrounding flue gases, but the temperature and oxygen are too low to initiate combustion of solid carbon. More importantly, the temperatures are too low in the upper furnace to cause the vitrification (melting or dead-burning) of the customized active carbon surface. Addition of oxidized mercury adsorbing material such as Ca, CaOH, $CaCO_3$, CaCl or other alkali materials (including recycled fly ash) provides a particulate adsorption surface for the mercury which has been oxidized through the properly designed heat transfer temperature gradient as a result of this carbon enhancement.

All of the prior art techniques in which streams of coal, oil or biomass in water are injected as fuel-lean reburn fuels are directed toward reducing nitric oxide through gasification and fuel-rich mixing within the overall fuel-lean region of the upper furnace of a combustion device. Because the fuel-lean reburn technique does not involve addition of completion air to complete combustion, the quantity and direction of the slurry stream allows precise control of how long and to what extent the carbonaceous material may be gasified before leaving the furnace combustion chamber as unburned carbon (sometimes referred to as UBC or LOI). The unburned carbon generated by controlled water gasification reaction in this way, even when water is gasifying the unburned carbon cloud contained in the furnace gases due to continuing combustion, does not melt or vitrify because the fuel-lean reburn process takes place in the cooler region (2,400° F. to 2,000° F.) of the upper furnace away from the high temperature (3,500° F.) primary combustion zone of the furnace.

Figure 2:
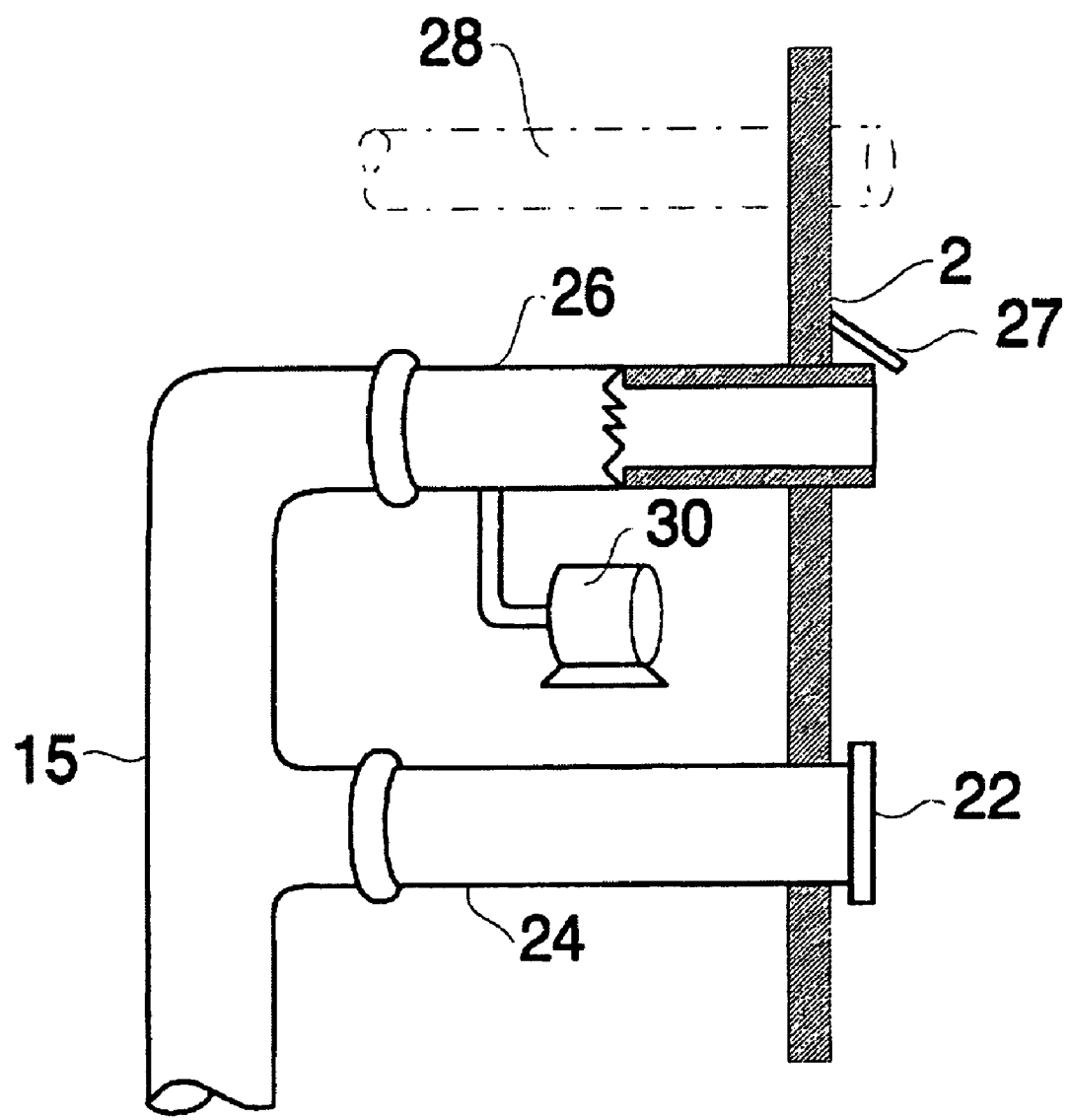
FIG. 2 is a diagram of a first present preferred injector that can be used in the process.

The use of multiple levels of injectors shown in FIG. 2 allows control of flue gas injection temperature window and slurry residence time in the upper furnace. An adjustable injector shown in FIG. 3 for injecting slurry gives an additional means to control flue gas injection temperature window and slurry residence time in the upper furnace.

At the same time, the amount of carbon gasified to CO and $H_2$ necessary for the above FLR $NO_x$ processes, relative to the amount activated to unburned carbon, can be precisely controlled by metering the amount of water in the coal water slurry along with its residence time before leaving the furnace. The slurry is injected as a spray, and the liquid drops quickly penetrate the flue gas and vaporize from the intense radiative heat field. As the water vapor and coal particles, either from slurry injection or from continuing combustion, rise as a plume in the upper furnace, the gasification and active carbon reactions occur in this plume. The gaseous products and active carbon then mix with the flue gas.

For example, if the stoichiometric quantity of water required for completion of the carbon-water reaction is 50% (all percentages by weight in this example),

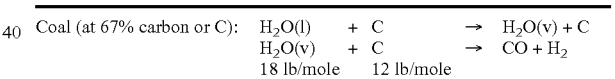

Coal (at 67% carbon or C): $H_2O(l) + C \rightarrow H_2O(v) + C$
$H_2O(v) + C \rightarrow CO + H_2$
18 lb/mole    12 lb/mole 1 mole $H_2O$ per mole C = 18/12 = 1.5 lb water/lb C * (0.67 lb C/lb coal) = 1 lb water/lb coal then by metering 45% of the slurry as water, 10% of the injected carbon will not gasify and thus will convert to activated carbon. This water gasification reaction has the advantage of using the fuel-lean reburn technique and its ability to reduce $NO_x$ as originally conceived. If no $NO_x$ reduction were desired then only the minimal water required to inject the carbon containing fuel as a slurry would be used to provide the in-situ activation of the carbon surface. The carbon/water gasification reaction at the proper temperature is still necessary to activate the carbon surface, rather than having the carbon surface partially burn, smolder or smoke in the low $O_2$ flue gas.

Figure 4:
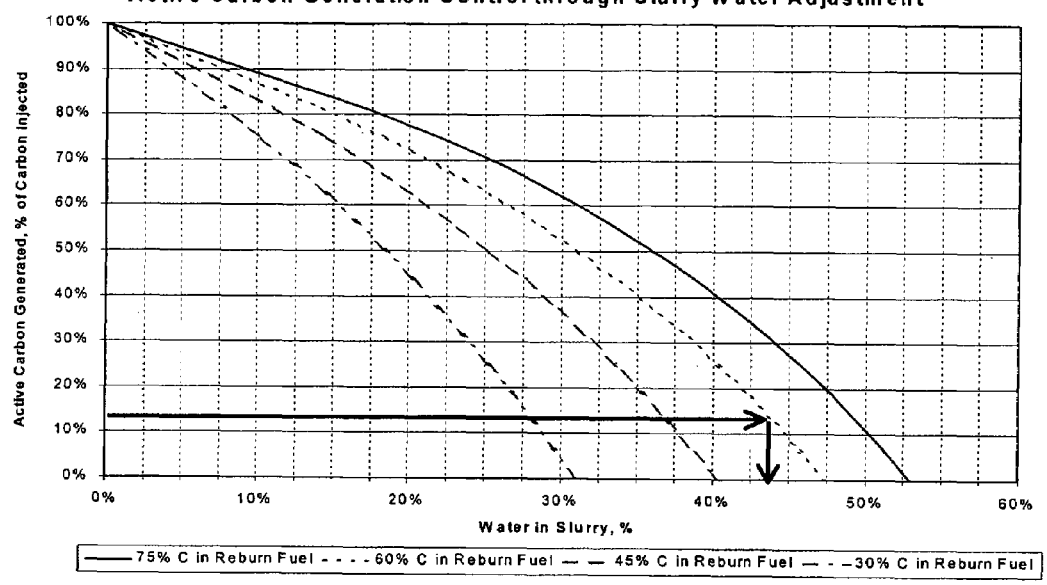
FIG. 4 is a graph showing amounts of active carbon that can be generated for four types of fuels in slurries of varying water content.

FIG. 4 shows an example of how the amount of water in the slurry can be controlled to give the desired level of active carbon generation from the injected slurry reburn fuel. This graph shows active carbon generated as a percentage of the total carbon in the injected slurry. Four curves are shown, corresponding to reburn fuels containing 75%, 60%, 45% and 30% carbon in the solid phase of the slurry. In the example highlighted with the bold arrows, the solid phase of the slurry contains 60% carbon. To generate 15% of that carbon as active carbon, the water content of the slurry would be reduced from the stoichiometric requirement of 47.4% water by weight to 43.6% water by weight. The active carbon which has been generated is available to collect oxidized mercury. The oxidized mercury $HgCl_2$ is formed from mercury and chlorine present in the flue gas as a result of combustion of mercury and chlorine containing fuels.

The $NO_x$ reburn process can now be optimized without the limitation that carbon must ultimately burn-out. The amount of water required to inject the carbon-containing fuel as a slurry and to control the LOI increase to the desired level would be used to provide the in-situ activation of the carbon surface. In the common case of a furnace operating with higher than desired LOI, the injection of water containing no carbon will lead to gasification and activation of carbon particles present in the furnace gases due to continuing combustion.

Figure 5:
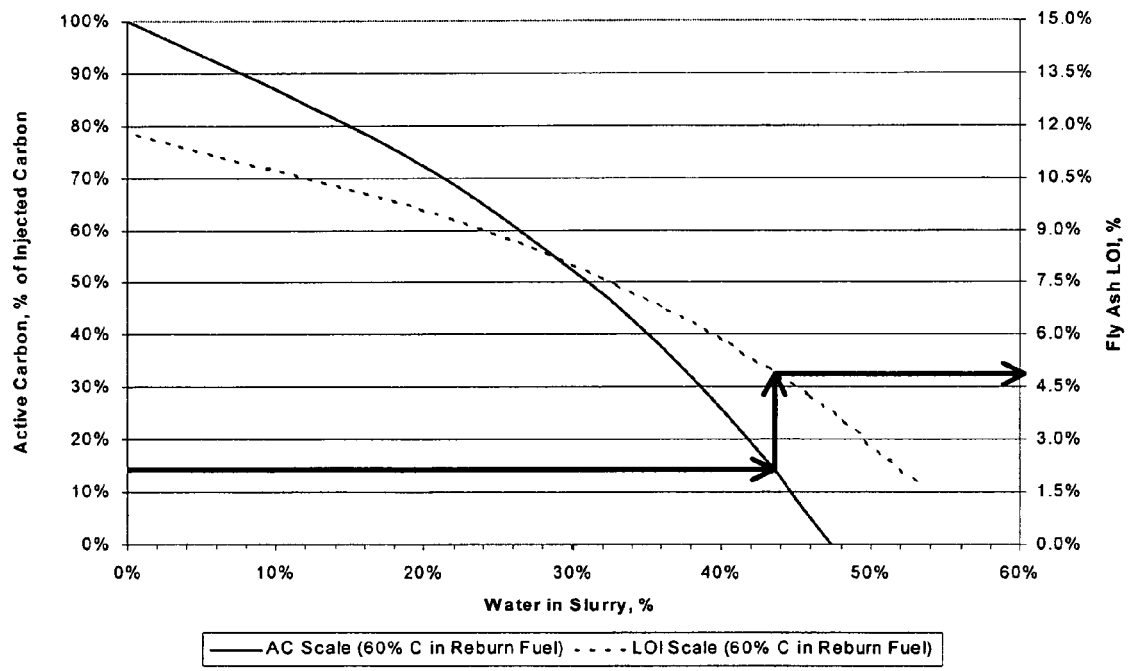
FIG. 5 is a graph showing the amount of activated carbon and fly ash loss on ignition at various water concentrations.

An example is shown in FIG. 5. As in FIG. 4, the solid phase of the slurry contains 60% carbon and 15% active carbon was generated by reducing the water content from 47.4% water by weight to 43.6% water by weight. This causes an increase in LOI from the baseline value of 2.0% to 4.8%. This is based on coal with 10% ash content and 10% of the total boiler fuel injected as coal/water slurry in the upper furnace.

It is typically desirable to maintain fly ash LOI levels below 5% whenever possible. This level of active carbon would be sufficient for the mercury oxidation enhancement process, and the increase in fly ash LOI is acceptable as well.

This method of active carbon injection has several important advantages over competing processes including simplicity and economic advantages; reduction of $NO_x$ emissions; ability to place controllable amounts of carbon in the right place before the 1450° F. economizer temperature window; and the ability to be spatially optimized by varying injection rate for where the best effect (maximum HgCl) is measured. Spatial optimization is possible as many independent variables remain uncontrolled such as spatial temperature ($T(z)$, $T(x,y)$), $NO_x$, Cl, $NH_3$, $SO_3$, $H_2O$ and CO. The independent variables can be optimized both for direct adsorption of Hg and other trace elements by activated carbon and for oxidation of these metals on the carbon surface. An automated method for optimization is the use of an adaptive, model predictive controller (AMPC), which can make a continuous predictive adjustment of the slurry injection, the ratio of water to coal in the slurry, and the area of injection; whether as slurry in the upper furnace, as higher water ratios in regions of continuing combustion in the mid-furnace (exiting the primary combustion zone) or as pulsed or steady water through the burner coal pipe.

Although we have described and illustrated certain present preferred embodiments of our method of removing mercury and $NO_x$ from flue gas through the formation of activated carbon particles in the flue gas, it should be distinctly understood that the invention is not limited thereto but may be variously embodied within the scope of the following claims.

We claim:

1. A method of removing mercury and $NO_x$ from flue gas produced by combustion devices burning mercury and chlorine containing fuel, the flue gas passing from a combustion zone in which the temperature exceeds 2600° F., through a first temperature zone in which the temperatures range from 1750° F. to 2100° F., through a second temperature zone in which the temperatures range from 900° F. to 1450° F., and through a particle removal device, the method comprising:
    selecting a reburn fuel containing carbon;
    preparing a slurry of the reburn fuel and water wherein a ratio of water to reburn fuel is such that when the slurry is injected into the flue gas prior to the first temperature zone where the temperature exceeds 2100° F. and combustion is occurring, a first portion of the reburn fuel will gasify and then will combine with a portion of the $NO_x$ in the flue gas and a second portion of the reburn fuel will form activated carbon particles;
    injecting the slurry into the flue gas prior to the first temperature zone where the temperature exceeds 2100° F. and combustion is occurring, where the first portion of the reburn fuel gasifies and subsequently combines with a portion of the $NO_x$ in the flue gas and a second portion of the reburn fuel forms activated carbon particles;
    passing the flue gas and activated carbon particles through the second temperature zone where the mercury and chlorine present in the flue gas as a result of combustion of the mercury and chlorine containing fuel will combine because of the presence of the activated carbon particles to form $HgCl_2$ and at least a portion of the $HgCl_2$ will bind to the activated carbon particles; and
    directing the flue gas to the particle removal device for removal of the activated carbon particles.

2. The method of claim 1, wherein the reburn fuel is coal.

3. The method of claim 1, wherein the reburn fuel provides up to 10% of a total heat input to the furnace.

4. The method of claim 1, also comprising changing the ratio of water to reburn fuel in the slurry to control an amount of activated carbon generated.

5. The method of claim 1, also comprising directing the flue gas to wet or dry scrubbers, wet or dry baghouses, or wet or dry electrostatic precipitators.

6. The method of claim 1, wherein the slurry contains at least one additive selected from the group consisting of fly ash, treated ash, HCl, $NH_4$ Cl and calcium containing compounds.

7. The method of claim 6, wherein the treated ash has been treated with at least one of Br, Cl, HCl, CaCl, $CaCO_3$ and CaO.

8. The method of claim 6, wherein the calcium containing compounds are selected from the group consisting of CaCl, CaO and $CaCO_3$.

9. The method of claim 1, wherein the slurry contains municipal solid waste.

10. The method of claim 9, wherein the municipal solid waste contains at least one chlorine containing compound.

11. The method of claim 10, wherein the chlorine containing compound is polyvinyl chloride.

12. A method of removing mercury from flue gas produced by combustion devices burning mercury and chlorine containing fuel, the flue gas passing from a combustion zone in which the temperature exceeds 2600° F., through a plurality of temperature zones in which the temperatures are less than 2600° F. and greater than 650° F., and through a particle removal device, the method comprising:
    injecting water or a slurry of a reburn fuel containing carbon and water into the flue gas in a manner to cause formation of activated carbon particles in the flue gas such that the activated carbon particles will be present where the mercury and chlorine are present in the flue gas as a result of combustion of mercury and chlorine containing fuel and the mercury and chlorine will combine because the activated carbon particles are present to form at least one of HgCl and $HgCl_2$ and at least a portion of the HgCl and $HgCl_2$ will bind to the activated carbon particles;
    directing the flue gas to the particle removal device for removal of the activated carbon particles; and using an adaptive model predictive controller to make a continuous predictive adjustment of the slurry injection, the ratio of water to coal in the slurry, and the area of injection; whether as slurry in the upper furnace, as higher water ratios in regions of continuing combustion in the mid-furnace or as pulsed or steady water through the burner coal pipe.

13. A method of removing mercury and $NO_x$ from flue gas produced by combustion devices burning mercury and chlorine containing fuel, the flue gas passing from a combustion zone in which the temperature exceeds 2600° F., through a first temperature zone in which the temperatures range from 1750° F. to 2100° F., through a second temperature zone in which the temperatures range from 900° F. to 1450° F., and through a particle removal device, the method comprising:

injecting water such that when the water is injected into the flue gas prior to the first temperature zone where the temperature exceeds 2100° F. and combustion is occurring, a first portion of the residual carbon in the flue gas will gasify and then will combine with a portion of the $NO_x$ in the flue gas and a second portion of the residual carbon in the flue gas will form activated carbon particles, the water being injected into the flue gas prior to the first temperature zone where the temperature exceeds 2100° F. and combustion is occurring, where the first portion of the residual carbon in the flue gas gasifies and subsequently combines with a portion of the $NO_x$ in the flue gas and a second portion of the residual carbon in the flue gas forms activated carbon particles;

passing the flue gas and activated carbon particles through the second temperature zone where the mercury and chlorine present in the flue gas as a result of combustion of the mercury and chlorine containing fuel will combine because of the presence of the activated carbon particles to form $HgCl_2$ and at least a portion of the $HgCl_2$ will bind to the activated carbon particles; and directing the flue gas to the particle removal device for removal of the activated carbon particles.

14. The method of claim 13, also comprising directing the flue gas to wet or dry scrubbers, wet or dry baghouses, or wet or dry electrostatic precipitators.

15. The method of claim 13, wherein the slurry contains at least one additive selected from the group consisting of fly ash, treated ash, HCl, $NH_4Cl$ and calcium containing compounds.

16. The method of claim 15, wherein the treated ash has been treated with at least one of Br, Cl, HCl, CaCl, $CaCO_3$ and CaO.

17. The method of claim 15, wherein the calcium containing compounds are selected from the group consisting of CaCl, CaO and $CaCO_3$.

18. The method of claim 13, wherein the slurry contains municipal solid waste.

19. The method of claim 18, wherein the municipal solid waste contains at least one chlorine containing compound.

20. The method of claim 19, wherein the chlorine containing compound is polyvinyl chloride.

\* \* \* \* \*